(12) United States Patent
Andrews et al.

(10) Patent No.: US 6,678,613 B2
(45) Date of Patent: Jan. 13, 2004

(54) METHOD AND APPARATUS FOR NOTIFYING A USER OF AN APPOINTMENT

(75) Inventors: Gregory Paul Andrews, Rochester, MN (US); Paul Reuben Day, Rochester, MN (US); Patrick Leo Glenski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 09/960,188

(22) Filed: Sep. 21, 2001

(65) Prior Publication Data

US 2003/0060979 A1 Mar. 27, 2003

(51) Int. Cl.$^7$ .................... G01C 21/00; G06G 7/78; G01S 21/00; G08G 1/123; H04B 7/185
(52) U.S. Cl. .................... 701/213; 701/201; 701/202; 701/204; 701/207; 701/208; 701/209; 701/211; 342/357.13; 342/357; 342/357.17; 340/995
(58) Field of Search .................... 701/213, 201, 701/202, 204, 207, 208, 209, 210, 211; 342/357.13, 357.17; 340/995, 996, 994

(56) References Cited

U.S. PATENT DOCUMENTS

| | | | |
|---|---|---|---|
| 5,790,974 A | * 8/1998 | Tognazzini | 455/456 |
| 5,938,721 A | 8/1999 | Dussell et al. | 701/211 |
| 5,959,577 A | 9/1999 | Fan et al. | 342/357.13 |
| 6,178,378 B1 | * 1/2001 | Leibold | 701/202 |
| 6,240,364 B1 | 5/2001 | Kerner et al. | 701/210 |
| 6,282,487 B1 | * 8/2001 | Shiomi et al. | 701/120 |
| 6,381,534 B2 | * 4/2002 | Takayama et al. | 701/201 |

* cited by examiner

Primary Examiner—William A Cuchlinski, Jr.
Assistant Examiner—Brain J. Broadhead
(74) Attorney, Agent, or Firm—Moser, Patterson & Sheridan, L.L.P.

(57) ABSTRACT

A method and apparatus for notifying a user of an appointment. In one embodiment, an appointment time and an appointment location is received for the appointment. A current location of a wireless device is determined. A travel time is estimated for the user to travel from the current location of the wireless device to the appointment location. A lead time is determined for the user to prepare prior to travel from the current location to the appointment location. The estimated travel time, the determined lead time and the appointment time is used to determine a projected start time. The user of the wireless device is notified of the appointment if a current time reaches the alarm time.

23 Claims, 10 Drawing Sheets

| 502A | 502B | 502C | 502D | 502E | 502F | 502G |
|---|---|---|---|---|---|---|
| APPOINTMENT # | ALARM LEAD TIME | CALENDAR @ ALARM TIME | GPS LOCATION DEPARTURE | GPS LOCATION ARRIVAL | ARRIVAL TIME | STRESS FACTOR |
| 1 | 15 MIN | LUNCH | CAFETERIA | DOCTOR'S OFFICE | 1:30 | HI |
| 2 | 30 MIN | DAY CARE | HOME | UNIVERSITY CLASSROOM | 11:00 | MED |
| 3 | 60 MIN | SLEEP | HOME | OFFICE | 7:30 | LOW |
| 4 | 20 MIN | LUNCH | CAFETERIA | DOCTOR'S OFFICE | 1:28 | HI |
| 5 | 23 MIN | LUNCH | CAFETERIA | DOCTOR'S OFFICE | 1:24 | HI |
| 6 | | | | | | |

| APPOINTMENT # 602A | LEAD TIME 602B | PROJECTED LEAD TIME NEXT APPOINTMENT 602C | TIME DIFF. (EARLY OR LATE AMT OF TIME) 602D | CALENDAR EVENT 602E |
|---|---|---|---|---|
| 1 | 15 | 20 | −5 | LUNCH TIME |
| 4 | 20 | 23 | −3 | LUNCH TIME |
| 5 | 23 | 23 | +1 | LUNCH TIME |
|   | 23 |   |   |   |

| 702 — HISTORY DATA CATEGORIES | VALUES ← 704 |
|---|---|
| LOCATION AT TIME OF ALARM | |
| 706A — HOME | 12 |
| YMCA | 30 |
| OFFICE | 20 |
| CALENDAR EVENT AT TIME OF ALARM | |
| 706B — LUNCH TIME | 23 |
| DAY CARE | 25 |
| WORKING | 20 |
| STRESS FACTOR | |
| 706C — HIGH | MULTIPLY BY 1.5 |
| MED | MULYIPLY BY 1.2 |
| LOW | MULTIPLY BY 1.0 |

METHOD AND APPARATUS FOR NOTIFYING A USER OF AN APPOINTMENT

BACKGROUND OF THE INVENTION

1. Field of the Invention

The invention relates to wireless communications systems and devices. More particularly, the invention relates to a method and apparatus for notifying a user of an appointment.

2. Background of the Related Art

Wireless devices, such as mobile phones, personal digital assistants (PDA) and two-way pagers, offer tremendous flexibility over conventional land-based telephone handsets. These wireless devices enable people to communicate from various places other than a residence, office or payphone. One application of wireless devices is to store information for scheduled appointments. Such appointment information generally includes a date and time to meet a doctor, friend or relative.

However, even if the information of the appointment is stored in the wireless device, a user of the wireless device may still arrive late for or even forget about the appointment. For example, the user may underestimate the travel time to timely arrive at the appointment location or confuse the appointment time as the start time.

To address this problem, some devices are configured to estimate the travel time. However, this approach merely provides the user with a start time based solely upon the estimated travel time. In practice, reliance by the user on a start time calculated in this manner still results in tardiness because the user often forgets to factor in the time to prepare for the travel to the appointment. As such, the user is prone to miscalculating the correct time to prepare and leave for a scheduled appointment. To overcome this problem, there is a need to notify the user of an accurate time to start preparing for an appointment.

SUMMARY OF THE INVENTION

The invention provides a method, apparatus and article of manufacture for notifying a user of an appointment. In one embodiment, an appointment time and an appointment location are received for the appointment. A current location of a wireless device is determined. A travel time is estimated for the user to travel from the current location of the wireless device to the appointment location. A lead time is determined for the user to prepare prior to travel from the current location to the appointment location. The estimated travel time, the determined lead time and the appointment time is used to determine an alarm time. The user of the wireless device may be notified of the appointment if a current time reaches the determined alarm time.

BRIEF DESCRIPTION OF THE DRAWINGS

The teachings of the present invention can be readily understood by considering the following detailed description in conjunction with the accompanying drawings, in which:

FIG. 5 shows an embodiment of a data collection table;

FIG. 6 shows a calendar event view representing a single variable view of history data;

FIG. 7 shows a summary view of history data;

To facilitate understanding, identical reference numerals have been used, where possible, to designate identical elements that are common to the figures.

DETAILED DESCRIPTION OF THE PREFERRED EMBODIMENTS

A method and apparatus for notifying a user of an appointment. In one embodiment, an appointment time and an appointment location is received for the appointment. A current location of a wireless device is determined. A travel time is estimated for the user to travel from the current location of the wireless device to the appointment location. A lead time is determined for the user to prepare prior to travel from the current location to the appointment location. The estimated travel time, the determined lead time and the appointment time is used to determine a projected start time. In one embodiment, the user of the wireless device is notified of the appointment if a current time reaches an alarm time.

Various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 1:
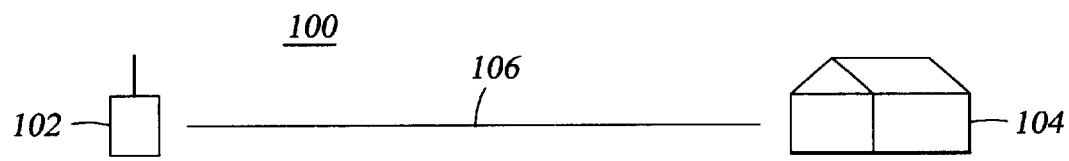
FIG. 1 depicts a map containing relative locations of a wireless device and a building used for an appointment.

FIG. 1 depicts a map 100 containing relative locations of a wireless device 102 and a building 104 used for an appointment. A user of the wireless device 102 schedules an appointment at a site located inside the building 104 at some time in the future. The user then enters the appointment location, e.g., the location of the building 104, and the appointment time into the wireless device 102. The appointment time is a time for the user to meet another person at the appointment location, e.g., building 104. In one embodiment, the appointment location may be attained using the wireless device 102. For example, the wireless device may execute a client program, such as a map program, to allow the user to locate the appointment location. Coordinates for the appointment location can then retrieved from a database, which may be resident on the client device or on a remote machine (not shown).

In one embodiment, the current location of the user is obtained from a position detector, e.g., a global positioning system (GPS), in the wireless device 102 or a device coupled to the wireless device 102. Using the current location, the appointment location and the path 106, and an estimated travel time can be calculated. The estimated travel time to the appointment location is dependent on the mode of transportation used to travel from the current location to the appointment location. Typical modes of transportation include an automobile, a bus, a plane, a train, and the like. In one embodiment, the estimated travel time is obtained from a map finder in the wireless device 102. In another embodiment, the user calibrates the time to travel to the appointment location. Initially, the user calibrates the wireless device 102 at the current location at a first calibration time. The user then travels to the appointment location, e.g., building 104, and calibrates the wireless device 102 at the appointment location at a second calibration time. The difference between the first and second calibration times is regarded as an estimate of the travel time. Of course, is it recognized that the user may not have previously traveled to the appointment location, in which case no historical travel time is available. In such cases, it is necessary to estimate the travel time according to the path 106. This may be done, for example, by allowing the user to select the path 106 from a plurality of possible paths stored in a database. Alternatively, a default path may be automatically selected by the wireless device 102 (e.g., the path having the shortest estimated travel time).

In one embodiment, the wireless device 102 is configured to notify the user of the appointment. To perform this notification, the wireless device 102 determines or projects an "alarm time". The projected alarm time is a prediction of when the user of the wireless device 102 needs to start preparing for the appointment in order to timely arrive for the appointment using a common form of transportation, e.g., an automobile, a plane, a train, a bus, and the like. The notification is provided if the projected start time is reached or exceeded, i.e., when the current time reaches or exceeds the projected alarm time. Forms of notification may include an audible alarm, an audible message, an electronic mail (e-mail) message or a calendar note. In another embodiment, the wireless device 102 transfers the notification to another non-GPS based device (not shown), e.g., a pager or a wristwatch. This other device would then provide the notification.

To determine the projected alarm time, the wireless device 102 initially determines the current location of the wireless device 102 and estimates a "travel time" for a user to travel from the current location of the wireless device 102 to the appointment location, e.g., along path 106 to building 104. The wireless device 102 also determines a "lead time" for the user to prepare prior to traveling from the current location to the appointment location. In one embodiment, the alarm time is the difference between the appointment time and the sum of the estimated travel time and the lead time. Stated differently, the difference between the alarm time and the appointment time is the sum of the estimated travel time and the lead time. The relationship between the alarm time, the appointment time, the travel time and the lead time is further described with respect to FIG. 2.

In another embodiment, the wireless device 102 may also notify the user if a reference time is reached or exceeded, i.e., the current time reaches or exceeds the reference time. For example, the user may enter the reference time into wireless device 102 as a reminder of the appointment time. The reference time may comprise a single reminder prior to the appointment time or a series of reminders prior to the appointment time.

Figure 2:
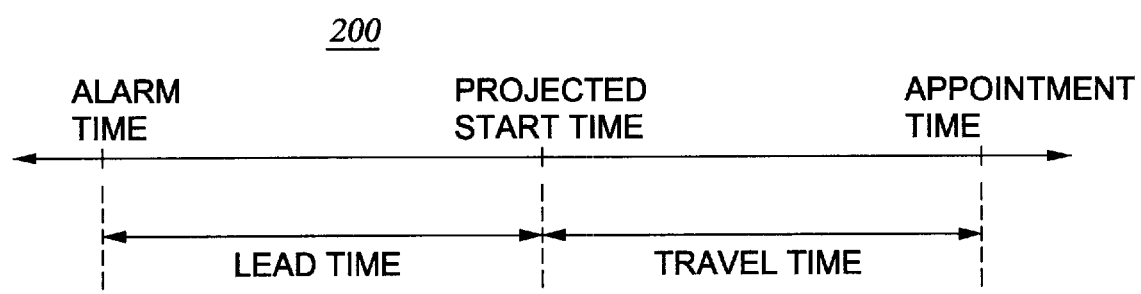
FIG. 2 depicts a time line to illustrate concepts used in determining an alarm time.

FIG. 2 depicts a time line 200 to illustrate concepts used in determining an alarm time. From an increasing order of time, the time line 200 includes the "alarm time", the projected "start time" and the "appointment time". The alarm time is the time to notify the user. In one embodiment, the alarm time is the time for the user to start preparing for the appointment prior to traveling to the appointment site. The appointment time represents the time of the appointment at an appointment location. The travel time represents an estimate of the travel time from the current location of the wireless device 102 to the appointment location. The travel time may be estimated from the map finder 308 (described below with reference to FIG. 3) or through calibration of the current and appointment locations.

The projected start time is the difference between the appointment time and the travel time. The projected start time is an estimate of the time to start travel from the current location of the wireless device 102. As such, if the location of the wireless device 102 changes, e.g., the user moves around, the estimated travel time and the corresponding projected start time may also change.

As shown in FIG. 2, the alarm time also factors in a lead time. Thus, the alarm time represents a prediction that is derived from the appointment time, the travel time and a lead time. The difference between the alarm time and the appointment time is the sum of the estimated travel time and the lead time.

An noted above, the lead time is an estimate of the time for a user to prepare for the appointment prior to traveling from the current location of the wireless device 102 to the appointment location. For example, the lead time may include time to take a shower, or time to eat a meal. The lead time may be a fixed amount of time or a function of the travel time, e.g., a percentage of the travel time.

In contrast to the estimated travel time, the lead time may be unrelated to the travel time for the user to travel from the current location to the appointment location. The lead time may comprise a fixed amount or interval of time, or a function of the estimated travel time. For example, the lead time may comprise a product of the adjusted travel time and a scaling factor. In one embodiment, progressive lead times (and associated alarms) are provided. For a given appointment, each progressive lead time may be longer or shorter than the others. Consider an example in which the wireless device 102 is configured with three progressive lead times for an appointment wherein the first lead time is longer than the second lead time, and the second lead time is longer than the third lead time. Each of the lead times may be separated from one another by some time interval and may be conditioned upon a user's current location. For example, the first lead time may define an alarm time six hours prior to the projected start time while a user is at home preparing for the appointment. A second lead time may be a lunchtime reminder with a lead time of two hours. A third lead time may be 15 minutes before the projected start time.

In another embodiment, lead times are adjusted according to a user's historical behavior patterns. For example, by collecting and analyzing appointment history, the wireless device 102 may determine that a user more frequently misses morning appointments as compared with afternoon appointments. Accordingly, the wireless device 102 may be configured to provide some amount of additional lead time for morning appointments. This approach may be further enhanced by configuring the wireless device 102 to determine lead times according to activity time slots of an electronic calendar accessible to the wireless device 102. For example, by collecting and analyzing historical appointment information, the wireless device 102 may determine that a user is typically delinquent to appointments in which the lead time alarm occurs during a particular activity (e.g., housework) indicated on an electronic calendar. In contrast, the wireless device 102 may determine that the user is typically timely to appointments in which the lead time alarm occurs during another type of activity, e.g., home day care. In each case, the lead time may be adjusted appropriately.

In another embodiment, the lead time is adjusted based on travel conditions such as direction of travel, location anomalies, speed, congestion, etc. Consider a situation in which a user is on a freeway moving in a direction away from the appointment location at a rapid speed. The lead time may then be adjusted to account for a number of conditions. One condition is that the user is on a freeway, which may be determined using a GPS. Another condition is each of the upcoming freeway exit ramps for each of which a separate lead time may be calculated. Another condition is the current traffic congestion information, which may be provided to the wireless device 102 from some remote location or gathered by some computerized system on board the user's vehicle using locally sensed information. Another condition is the current lane in which the user is driving (which may be determined according to the GPS coordinates for the user's vehicle) and the time needed to switch lanes. This determination may also be made with reference to current congestion information, which may affect the user's ability to change lanes. Another condition is the user's stress level, which may be a function of the traffic congestion and the importance of the appointment. Thus, in one embodiment, the user may input a "stress factor" parameter into the wireless device for use in calculating the lead time. Additionally or alternatively, the stress factor may be computed by the wireless device 102 based on past missed appointments and/or post appointment user responses input to the wireless device 102.

Figure 3:
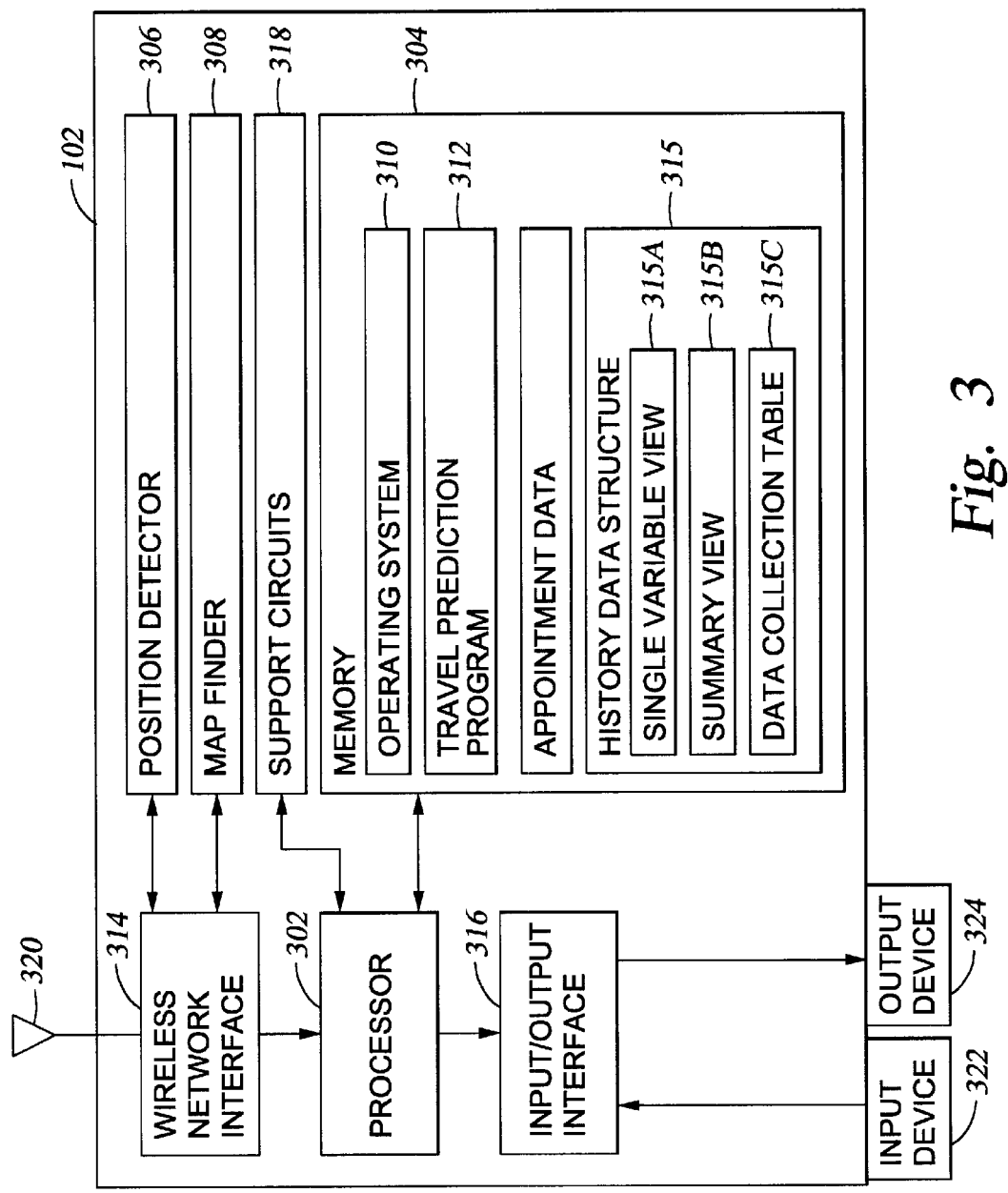
FIG. 3 depicts a block diagram of the wireless device of FIG. 1.

FIG. 3 depicts a block diagram of a wireless device 102. The wireless device 102 may represent any mobile device capable of determining a current location of the device 102. In one embodiment, the wireless device 102 contains a global positioning system (GPS) device. Examples of the wireless device 102 include a mobile phone, a personal digital assistant (PDA), and the like. One embodiment of the wireless device 102 comprises a processor 302, a memory 304, a position detector 306 and a map finder 308.

The processor 302 performs instructions based upon the requirements of an operating system 310, a travel prediction program 312, an appointment data structure 313 and a history data structure 315 stored in the memory 304. The processor 302 executes the travel prediction program 312 to implement the embodiments of the present invention. In one embodiment, the processor 302 determines a projected alarm time for an appointment and notifies the user of the appointment when the projected alarm time is reached or exceeded.

The memory 304 stores the necessary data and programming structures necessary for the operation of the wireless device 102. Illustratively, the memory 304 stores the operating system 310, the travel prediction program 312, the appointment data structure 313 and the history data structure 315. Additionally, the memory 304 may store other application programs (not shown). The memory 304 may comprise a combination of memory devices including random access memory (RAM), nonvolatile or backup memory (e.g., programmable or flash memories, read only memories (ROM), and the like).

The position detector 306 determines the current location or position of the wireless device 102. In one embodiment, the position detector 306 comprises a global positioning system (GPS). The map finder 308 estimates the time to travel from a current location of the wireless device 102 to the appointment location. The map finder 308 may comprises a commercially available program module, e.g., Mapquest. Although the map finder 308 is depicted as a program module, another embodiment of the map finder 308 is an application program in the memory 304.

The operating system 310 manages the operation of the wireless device 102. Namely, the operating system 310 coordinates the notification of the appointment to the user of the wireless device 102. The travel prediction program 312 contains instructions for notifying the user of the wireless device 102 of the appointment. The appointment location and appointment time are contained in the appointment data structure 313. In one embodiment, the notification occurs when a projected alarm time is reached or exceeded. To determine the alarm time, the travel prediction program 112 includes instructions to obtain the location of the wireless device 102 from the position detector 306 and to estimate a travel time from the map finder 308. The program 112 also includes instructions to determine a lead time and to determine the alarm time from the lead time, the estimated travel time and the appointment time.

The support circuits 318 include devices that support the operation of the wireless device 102. Examples of support circuits include a power supply, a clock, and the like. The wireless network interface 314 comprises controllers to enable the wireless device 102 to receive and transmit information via the antenna 320. Namely, the wireless network interface 314 enables the position detector to receive information for the determination of the location of the wireless device 102. The input/output interface 316 comprises controllers used to couple the processor 302 to the input device 322 and the output device 324. Namely, the input/output interface 316 enables the transmission of information containing voice, text and video between the processor 302, the input device 322 and the output device 324.

The input device 322 may comprise any device utilized to provide input to the wireless device 102. Examples of the input device 322 include a keypad, a microphone, a touch screen, a light pen, and the like. The output device 324 may comprise any device utilized to provide output for the wireless device 102. Examples of the output device 324 include a speaker and a display. Although the output device 324 is shown separately from the input device 322, the output device 324 may be combined with the input device 322.

The information contained in the history data structure 315 is used to provide a single variable view 315A and a summary view 315B and to populate a data collection table 315C. Embodiments of the summary view 315A, the single variable view 315B and the data collection table 315C will now be described with reference to FIGS. 5–7.

Referring first FIG. 5, an embodiment of the data collection table 315C is shown. In general, the data collection table 315C is a table organized as a series of columns and rows. Each row defines a record for a particular appointment. The columns include an appointment column 502A, an alarm lead time column 502B, a calendar event column 502C, a GPS departure location column 502D, a GPS arrival location 502E, an arrival time column 502F and a stress factor column 502G. Each entry under the appointment column 502A contains an appointment number by which the particular appointment for that record can be identified. The alarm lead time column 502B specifies a lead time for the appointment. The entries under the calendar event column 502C specify a calendar event that occurred at the time an alarm was signaled according to the lead time. The entries in the GPS departure location column 502D specify the location of the user at the time of the lead time alarm. The GPS arrival location 502E specifies the appointment location, while the arrival time column 502F specifies the time at which the user arrived at the appointment location. The stress factor column 502 contains a factor which may have been used in calculating the lead time.

Referring now to FIG. 6, a calendar event view 600 (representing one of the single variable views 315A) of the history data is shown. The view 315A shown in FIG. 6 is one example specifically configured for a single condition, i.e., a lunchtime calendar event. A similar table is kept for each of the other calendar events (e.g., daycare, working) as well as for each GPS departure location.

In general, the calendar event view 600 is a table organized as a series of columns and rows, where each row defines a record for a particular appointment. The particular appointment is identified in the appointment column 602A. The entries of the lead time column 602B are populated using the alarm lead time column 502B of the history data structure 315. Each entry of a projected lead time column 602C provides a lead time to be used for the next appointment. The projected lead time is calculated using a time difference value contained in the entries of a time difference column 602D. The time difference value indicates a time quantity by which a user was late or early to an appointment. Finally, a calendar event during which the lead time alarm was signaled is specified in a calendar event column 602E.

In general, the time difference value is added to the respective entry of the lead time column 602B to calculate the projected lead time in the respective entry of the projected lead time column 602C. In the illustrative embodiment, if the time difference value is negative, then the respective lead time of the same record is increased by the absolute value of the time difference value. For example, in the first record, the projected lead time (20) is the sum of the lead time (15) and the absolute value of the time difference (−5). If the time difference value is positive, then the respective lead time of the same record is decreased by the value of the time difference value. However, in the illustrative embodiment, the lead time is only decreased if the time difference value is greater than some predefined threshold. For example, if the time difference value is greater than or equal to 5 minutes (or some percentage of the lead time), then the projected lead time is the lead time less the time difference value. On the other hand, if the time difference value is less than 5 minutes (or some percentage of the lead time), then the projected lead time is set equal to the original lead time (i.e., the original lead time is not changed). This minimizes small fluctuations in the projected lead time and provides greater stability.

In one embodiment, the time differences for any given condition (or plurality of conditions) may be generalized (as percentages, for example) and then applied to calculate lead times for other conditions. For example, consider a user who is historically late to appointments by some number of minutes equal to 10 percent of the lead time. This information can then be used to adjust user specified lead times upwardly by 10 percent.

Referring now to FIG. 7, a summary view 315B of the history data is shown. In this view, the history data contained in the history data structure 315 has been sorted into two columns 702 and 704. A first column 702 contains entries 706A–C, each of which contains history data categories. For simplicity, only three entries 706A–C are shown; however, it is contemplated that any number of entries may be provided. By way of example, a first entry 706A is formatted according to the user's location at the time of the alarm (i.e., the location identified in the entry under the GPS departure location column 502D of the data collection table 315C). A second entry 706B is formatted according to the calendar event at the time of the alarm. A third entry 706C indicates the stress factors. The values associated with each of the entries 706A–C are contained in the second column 704. In the present illustration, the first two entries 706A–B contain a plurality of lead times. Specifically, the lead time for each subcategory of each entry 706A–B (e.g., home, YMCA, office in the case of the first entry 706A) is the latest projected lead time from each single variable view 315A. The use of the foregoing data structures and views will be described below with reference to FIG. 4.

Figure 4A:
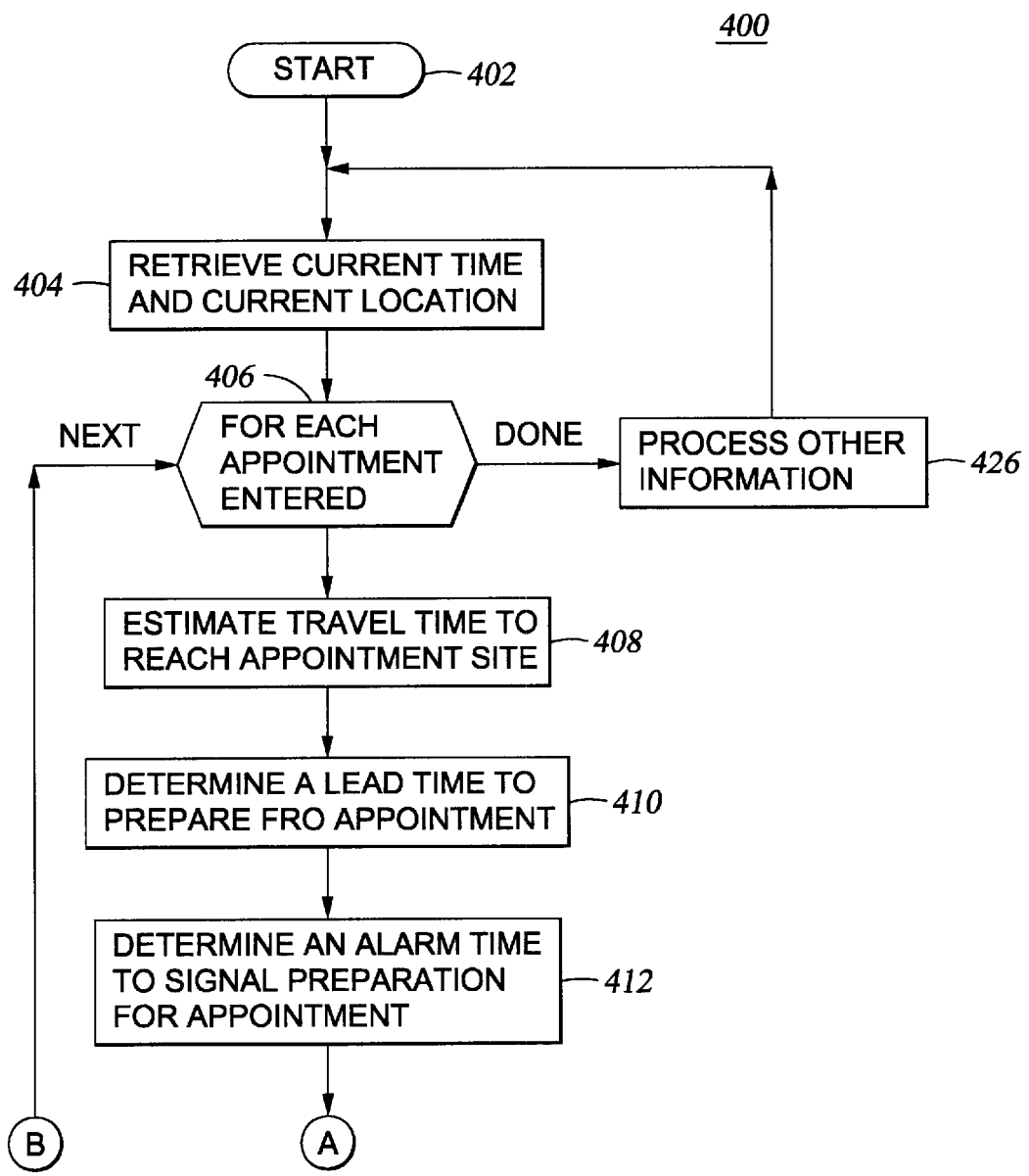
FIGS. 4A and 4B, taken together, depict a flow diagram of a method for alerting a user of an upcoming appointment in accordance to the present invention.
Figure 4B:
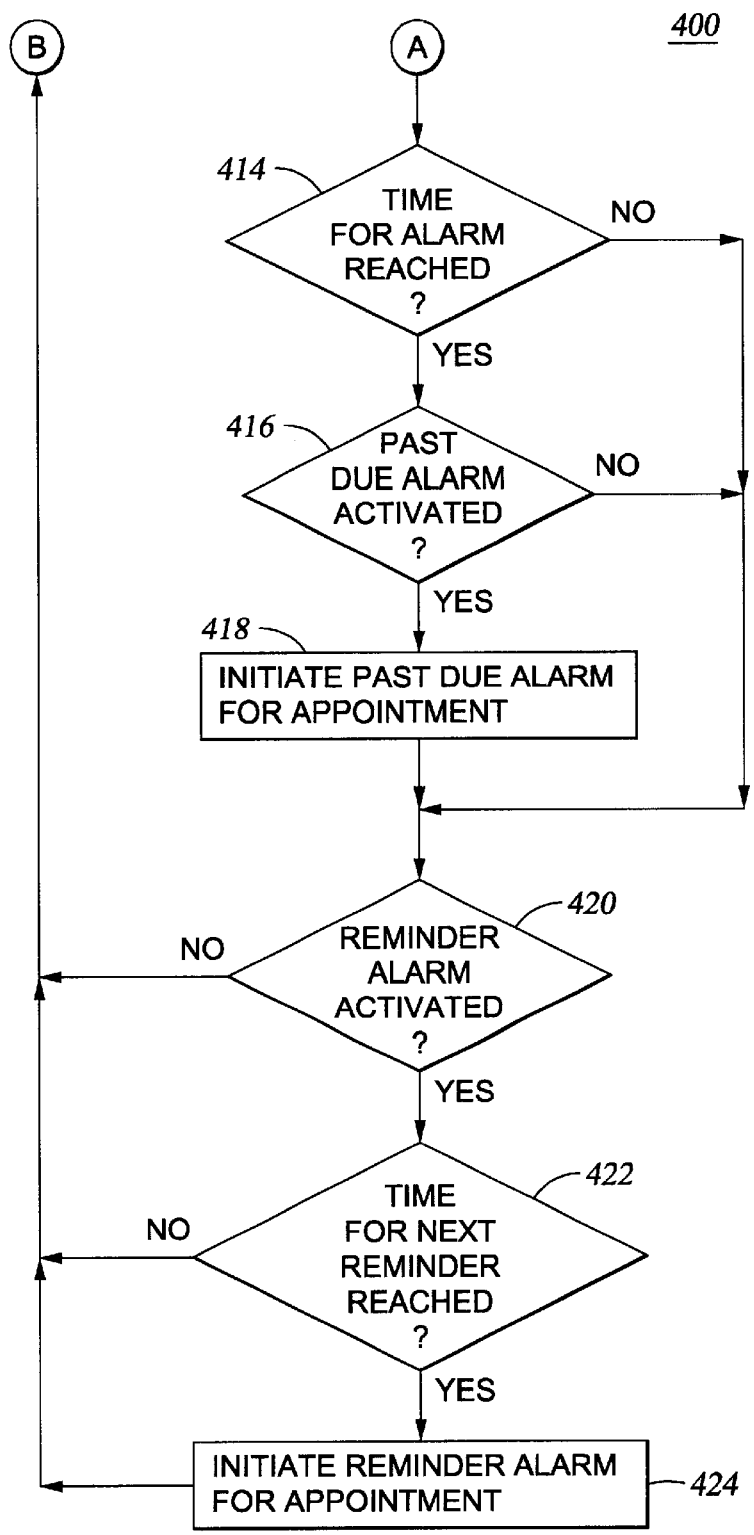

FIG. 4 depicts a flow diagram of a method 400 for notifying a user of an upcoming appointment. In one embodiment, the method 400 determines an "alarm time" for the user to prepare for the appointment and initiates an alarm when the current time reaches or exceeds the determined alarm time. Specifically, the method 400 starts at step 402 and proceeds to step 404 where a current time is retrieved from the support circuits 318, e.g., a clock, and the current location of the wireless device 102 is retrieved from the position detector 306. At step 406, the method 400 processes each appointment stored in the memory 304 of the wireless device 304.

The method 400 proceeds to step 408 where the travel time to reach the appointment site is estimated. In one embodiment, step 408 retrieves the travel time that is determined by the map finder 308. At step 410, the method 400 may determine a lead time in preparation of travel. Embodiments for determining the lead time are described with brief reference to FIG. 8.

Figure 8:
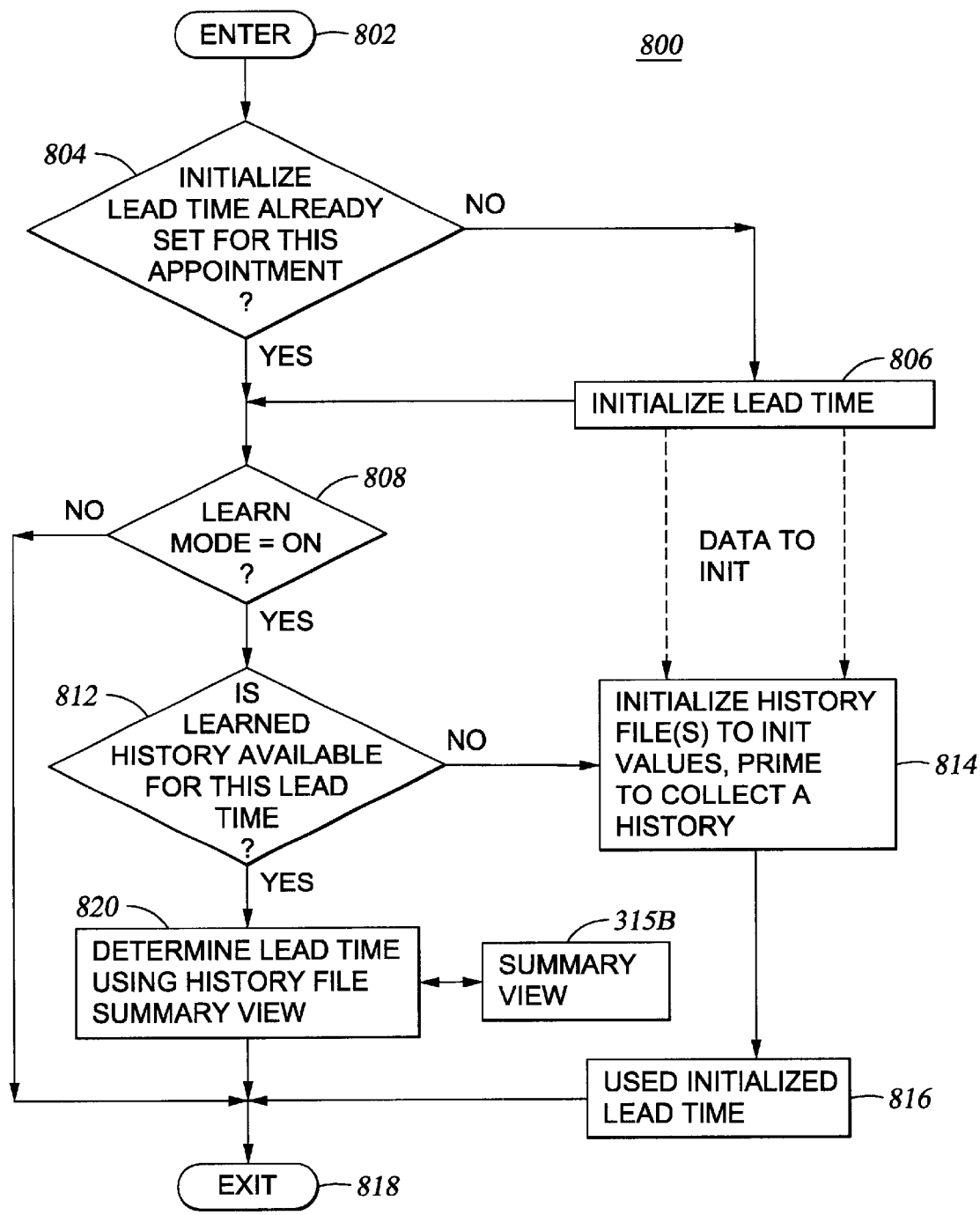
FIG. 8 shows a method for determining a lead time.

FIG. 8 shows a method 800 entered at step 802 and proceeding to step 804 to query whether a lead time has already been set for the particular appointment being processed. If not, the lead time is set at step 806. The lead time may be a fixed amount of time or a multiplier applied to the travel time of step 408. The exact form of lead time may be configured in the wireless device 102 or selected by the user. The method 800 then proceeds to step 808 to query whether a learn mode is ON. If not, the previously set lead time will be used, as indicated by step 816, and the method 800 exits at step 810.

If the query at step 808 is answered affirmatively, the method 800 proceeds to step 812 and queries whether history data (in the history data structure 315) is available for the set lead time. If not, the history files (views 315A–B and data collection table 315C) are initialized, at step 814, to begin collecting a history. The method 800 then proceeds to step 816 and 818, as described above.

If step 812 is answered affirmatively, the method 800 proceeds to step 820 indicating that the lead time will be determined using the summary view 315B. Various embodiments are contemplated for determining the lead time at step 820. For example, an average of the projected lead times may be used. This approach may be particularly appropriate where certain criteria are met, such as when a user is at the office and the calendar event is lunchtime. Where only a single lead time entry is used from the summary view 315B, it may be desirable to prioritize the lead times. For example, the wireless device 102 may be configured to select the lead time first according to the location, if such an entry applies, and otherwise to select an entry based on a calendar event. This lead time may also be adjusted according to the associated stress factor for the current conditions. The method 800 then exits at step 818.

Returning to FIG. 4, the method 400 proceeds from step 410 to step 412 where a projected alarm time is determined. The alarm time provides the user with sufficient time to prepare and travel to the appointment. In one embodiment, the alarm time is the difference between the appointment time and the sum of the estimated travel time and the lead time.

At step 414, a query determines whether the current time reaches or exceeds the projected alarm time. If the current time has not reached or has exceeded the projected alarm time, the method 400 proceeds to step 420. If the current time has reached or exceed the projected alarm time, the method 400 proceeds to step 416 where a query determines whether a past due alarm has been activated for this appointment. The past due alarm represents an indication for the user of the wireless device 102 to start preparing for the appointment.

If the past due alarm has not been activated, the method 400 proceeds to step 420. If the past due alarm has been activated, the method 400 proceeds to step 418 where the past due alarm is initiated for the appointment. Although step 418 is described in terms of an alarm for the wireless device 102, step 418 may also include other forms of notification, e.g., an audible message, an electronic mail (e-mail) message, a calendar note, and the like. In another embodiment, step 418 may also transfer the alarm or notification to a non-GPS based device coupled to the wireless device 102. The non-GPS based device would then provide the alarm or notification.

At step 422, a query determines whether the current time reaches or exceeds the time for the next reminder for the appointment. If current time exceeds the time for the next reminder, then the method 400 proceeds to step 424 where a reminder alarm is initiated for the appointment. The reminder alarm is a preset alarm that reminds the user of the appointment. Different formats of the reminder alarm exist. For example, the reminder alarm may comprise a one-time alarm or a periodic alarm. Step 424 may also include the same types of notification as step 418.

After step 422/424, the method 400 proceeds to process the next appointment at step 406. Returning to step 422, if the current time does not exceed the time for the next reminder for the appointment, the method 400 directly proceeds to process the next appointment at step 406. Once all the appointments are processed, the method 400 proceeds to step 426 where other information is processed. Such information may include changes of appointment time, appointment location, and activation (or deactivation) of the alarm. Step 426 may also include a delay such that the method 400 is repeated at different intervals, e.g., every five minutes. After step 426, the method 400 returns to step 404.

Figure 9:
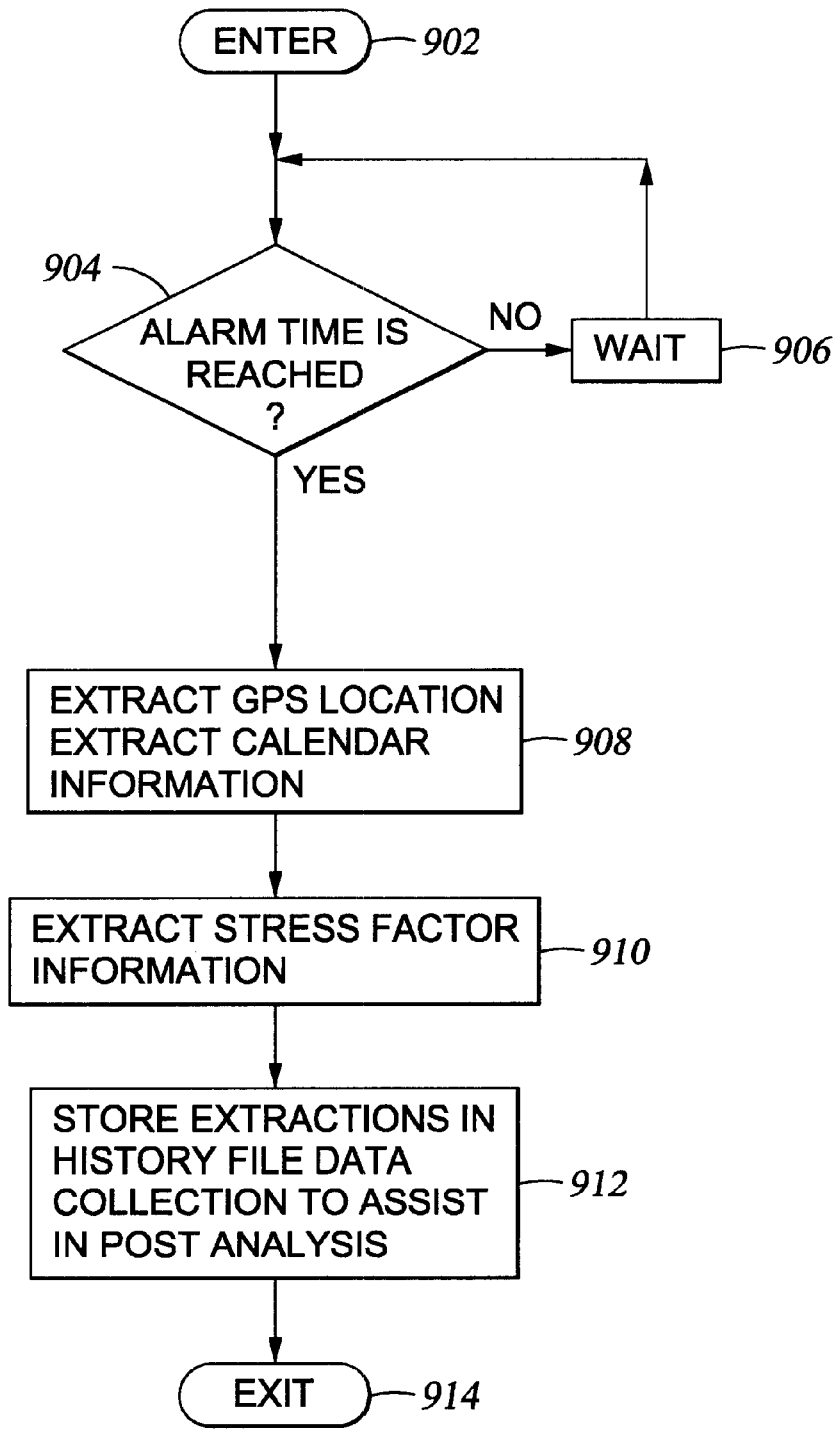
FIG. 9 shows a method for gathering information to assist in post appointment analysis.

One embodiment of step 424 is described with reference to FIG. 9. FIG. 9 shows a method 900 entered at step 902 and proceeding to step 904 to determine whether the alarm time is reached. If not, the method 900 waits for some predetermined period of time at step 906. Once the alarm time is reached, processing continues to step 908 where the current GPS location and the appropriate calendar information (i.e., the user's current activity based on a calendar entry) are extracted. At step 910, stress factor information is extracted. In general, stress factor information may be extracted via a manual method or an automatic method. The manual method involves receiving user input to questions (e.g., "Do you get stressed in heavy traffic?", "do you get stressed during bad weather?", etc.) which may be prompted on a display screen of the wireless device 104. The automatic method may include collecting information from a plurality of sources and then correlating the information to present conditions (e.g., traffic conditions, construction, weather, etc.). Illustrative sources include all appointment slots of the history data structure 315, post appointment user input, etc. The information extracted at steps 908 and 910 may then be stored in the history data collection 315 to assist in post appointment analysis. The method 900 exits at step 914.

Figure 10:
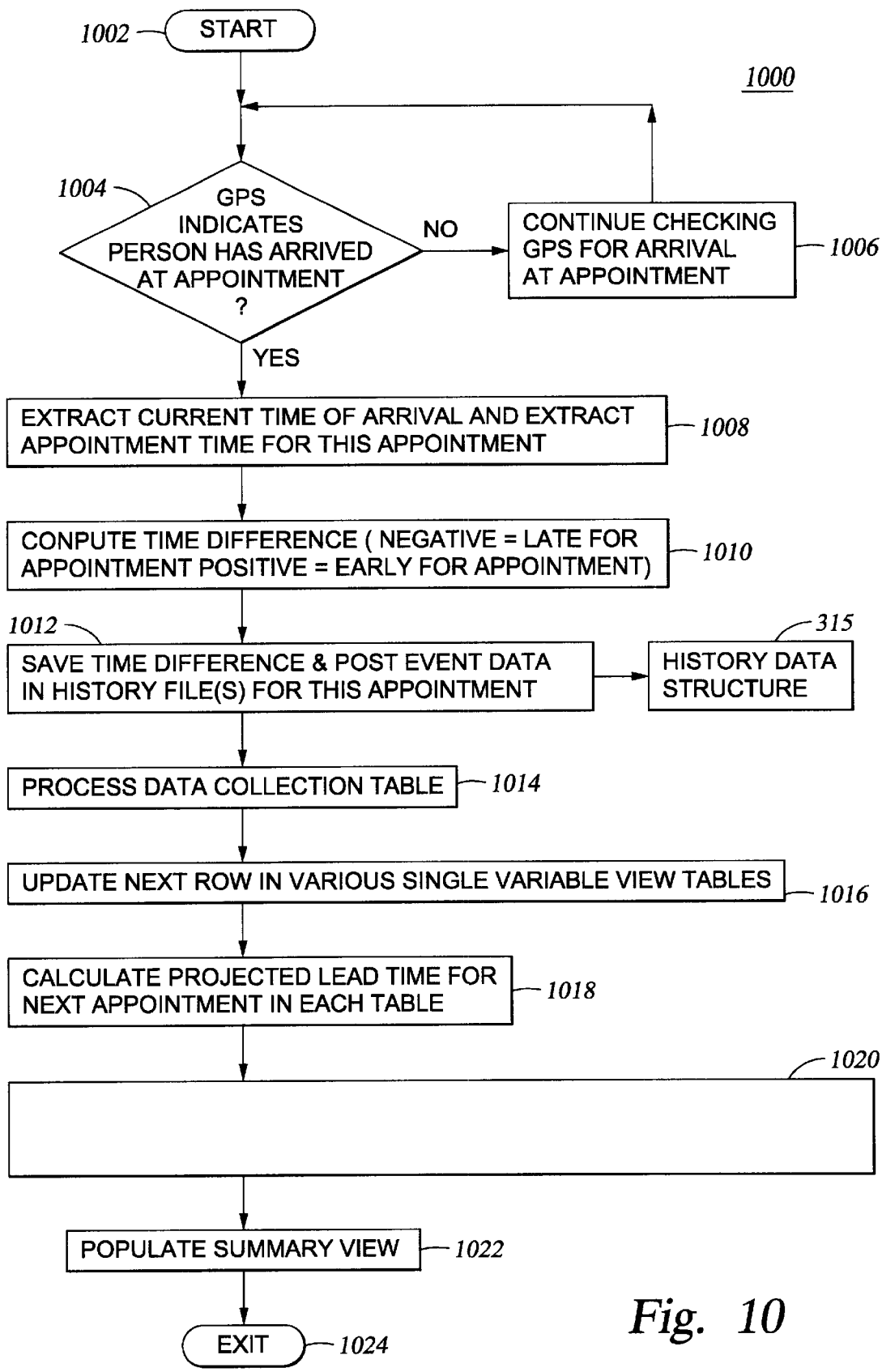
FIG. 10 shows a method of post appointment analysis.

One embodiment of post appointment analysis is illustrated as method 1000 in FIG. 10. The method 1000 enters at step 1002 and proceeds to step 1004 to determine whether a current GPS location indicates that the user has arrived at the appointment location. If not, the GPS location is periodically checked at step 1006. Once the user has arrived at the appointment location processing proceeds to step 1008 where the time of arrival and the appointment time are extracted. The difference between the time of arrival and the appointment time is calculated at step 1010. The post appointment data determined at steps 1008 and 1010 is then stored to the history data structure 315 at step 1012.

At step 1014, the data collection table 315C is processed. At step 1016 the next row in each of the single variable views 315A is created. For example, if the alarm went off during lunchtime (a calendar event) then a row is added to the calendar event single variable view 600. Additionally, a row is added for each of the other single variable views 315A (e.g., GPS departure location view). Thus, multiple rows in multiple views will be populated for a single arrival in order to correlate lead times to various criteria. At step 1018, a projected lead time is calculated for the next appointment in each single variable view 315A (there may be more than one). That is, the lead time entry (of the lead time columns 602B) for the record is populated with the projected lead time contained in the previous record (in the projected lead time columns 602C). Processing then proceeds to step 1022 where the summary view 315B is populated with the latest projection lead time from the single variable views 315A. The method 1000 is exited at step 1024.

In another embodiment, the wireless device 102 is configured with an auto call-ahead feature. In general, the auto call-ahead feature places an automatic call to an appointee telephone number to inform the party of the user's estimated time of arrival. In one embodiment, the automatic call is placed contemporaneously with or after the past due alarm at step 416 when the user is running late. A determination that the user is running late may be made by determining whether the user can reach the appointment location before the schedule appointment time based on the user's current location. Illustratively, an auto call-ahead telephone call may be placed in one of two modes. In one mode, the appointee party (the party with whom the user has an appointment) is notified that the user is already traveling toward the appointment location, in which case arrival is fairly certain, albeit late. In another mode, the appointee party is notified that the user has not initiated travel to the appointment location. In the latter mode, the appointee party is given the opportunity to call the user and determine their status. Alternatively or additionally, the appointee party may adjust the user's appointment and allow someone else to occupy the appointment time period.

Although various embodiments which incorporate the teachings of the present invention have been shown and described in detail herein, those skilled in the art can readily devise many other varied embodiments that still incorporate these teachings.

What is claimed is:

1. A method of notifying a user of an a appointment for which an appointment time and appoint location are provided, the method comprising:

determining a current location of a wireless device operated by the user;

estimating a travel time for the user to travel from the current location to the appointment location;

determining a lead time for the user to prepare prior to travel from the current location to the appointment location, wherein determining the lead time comprises determining a progressive lead time scheme comprising at least two lead time periods;

determining an alarm time using the estimated travel time, the lead time and the appointment time, wherein determining the alarm time comprises determining an alarm time for each of the at least two lead time periods; and notifying the user of the wireless device of the appointment if a current time reaches the alarm time.

2. The method of claim 1 wherein determining the alarm time comprises:

subtracting the estimated travel time from the appointment time to obtain a projected start time; and subtracting the determined lead time from the projected start time to obtain the alarm time.

3. The method of claim 1 wherein the lead time is unrelated to travel time for the user to travel from the current location to the appointment location.

4. The method of claim 1 wherein the notifying uses at least one of an audible alarm, an audible message, an electronic mail message and a calendar note.

5. The method of claim 4 further comprising:

transmitting the at least one of the audible alarm, the audible message, the electronic mail message and the calendar note from a GPS based device to a non-GPS based device.

6. The method of claim 1 further comprising issuing a user status notice to the appointment location if the current time reaches the alarm time.

7. A method of notifying a user of an appointment for which an appointment time and appoint location are provided, the method comprising:

determining a current location of a wireless device operated by the user;

estimating a travel time for the user to travel from the current location to the appointment location;

determining a lead time for the user to prepare prior to travel from the current location to the appointment location; wherein determining the lead time comprises at least one of:

utilizing historical appointment timeliness information of the user; and utilizing calendar information indicating activity of the user during particular time slots;

determining an alarm time using the estimated travel time, the lead time and the appointment time; and notifying the user of the wireless device of the appointment if a current time reaches the alarm time.

8. The method of claim 7, wherein utilizing historical appointment timeliness information of the user comprises calculating a projected lead time using a timeliness value for a previous trip to the appointment location, wherein the timeliness value is a time quantity by which the user arrived early to the appointment location.

9. The method of claim 7, wherein utilizing historical appointment timeliness information of the user comprises selecting a projected lead time from one of a calendar event projected lead time and a location projected lead time, wherein the calendar event projected lead time is based on a regularly repeating activity in a schedule of the user during which the user left for the appoint location on previous trips and wherein the location projected lead time is based on a departure location at which the user was present when previous alarms were signaled for previous trips to the appointment location.

10. A wireless device for notifying a user of an appointment, the apparatus comprising:

a memory for storing a travel prediction program and appointment information;

a wireless interface for receiving information from a remote location in a wireless communications network; and a processor which, upon executing the time prediction program, is configured to:

receive an appointment time and an appointment location previously stored in the memory for the appointment;

estimate a travel time for the user to travel from a current location of the user to the appointment location;

determine a lead time for the user to prepare prior to travel from the current location to the appointment location, wherein the lead time is determined by utilizing at least one of: historical appointment timeliness information of the user; and calendar information indicating activity of the user during particular time slots;

determine an alarm time using the estimated travel time, the determined lead time and the appointment time, and notify the user of the wireless device of the appointment if a current time reaches the determined alarm time.

11. The wireless device of claim 10 further comprising:

a position detector for detecting the current location of the wireless device.

12. The wireless device of claim 11 wherein the position detector comprises a global positioning system (GPS) device.

13. The wireless device of claim 10 wherein the processor is configured to utilize historical appointment timeliness information of the user by calculating a projected lead time using a timeliness value for a previous trip to the appointment location, wherein the timeliness value is a time quantity by which the user arrived early to the appointment location.

14. The wireless device of claim 13 wherein the processor is configured to utilize historical appointment timeliness information of the user by selecting a projected lead time from one of a calendar event projected lead time and a location projected lead time, wherein the calendar event projected lead time is based on a regularly repeating activity in a schedule of the user during which the user left for the appoint location on previous trips and wherein the location projected lead time is based on a departure location at which the user was present when previous alarms were signaled for previous trips to the appointment location.

15. A computer readable medium containing a program which, when executed, performs operations of notifying a user of an appointment for which an appointment time and appoint location are provided, the operations comprising:

estimating a travel time for the user to travel from a current location of the user to the appointment location;

determining a lead time for the user to prepare prior to travel from the current location to the appointment location, wherein determining the lead time comprises determining a progressive lead time scheme comprising at least two lead time periods;

determining an alarm time using the estimated travel time, the lead time and the appointment time, wherein determining the alarm time comprises determining an alarm time for each of the at least two lead time periods; and notifying the user of the wireless device of the appointment if a current time reaches the alarm time.

16. The computer readable medium of claim 15, wherein determining the alarm time comprises:

subtracting the estimated travel time from the appointment time to obtain a projected start time; and subtracting the determined lead time from the projected start time to obtain the alarm time.

17. The computer readable medium of claim 15, wherein the notifying comprises utilizing at least one of an audible alarm, an audible message, an electronic mail message and a calendar note.

18. The computer readable medium of claim 17, further comprising:

transmitting the at least one of the audible alarm, the audible message, the electronic mail message and the calendar note from a GPS based device to a non-GPS based device.

19. The computer readable medium of claim 15, wherein the estimating, the determining of the lead time and the determining of the alarm time are repeated periodically until the notifying occurs.

20. A computer readable medium containing a program which, when executed, performs operations of notifying a user of an appointment for which an appointment time and appoint location are provided, the operations comprising:

estimating a travel time for the user to travel from a current location of the user to the appointment location;

determining a lead time for the user to prepare prior to travel from the current location to the appointment location; wherein determining the lead time comprises at least one of: utilizing historical appointment timeliness information of the user; and utilizing calendar information indicating activity of the user during particular time slots;

determining an alarm time using the estimated travel time, the lead time and the appointment time; and notifying the user of the wireless device of the appointment if a current time reaches the alarm time.

21. The computer readable medium of claim 20, wherein utilizing historical appointment timeliness information of the user comprises calculating a projected lead time using a timeliness value for a previous trip to the appointment location, wherein the timeliness value is a time quantity by which the user arrived early to the appointment location.

22. The computer readable medium of claim 20, wherein utilizing historical appointment timeliness information of the user comprises selecting a projected lead time from one of a calendar event projected lead time and a location projected lead time, wherein the calendar event projected lead time is based on a regularly repeating activity in a schedule of the user during which the user left for the appoint location on previous trips and wherein the location projected lead time is based on a departure location at which the user was present when previous alarms were signaled for previous trips to the appointment location.

23. A method of notifying a user of an appointment for which an appointment time and appoint location are provided, the method comprising:

determining a current location of a wireless device operated by the user;

estimating a travel time for the user to travel from the current location to the appointment location;

determining a lead time for the user to prepare prior to travel from the current location to the appointment location, wherein determining the lead time comprises applying user stress factors reflecting user responses to driving conditions;

determining an alarm time using the estimated travel time, the lead time and the appointment time; and notifying the user of the wireless device of the appointment if a current time reaches the alarm time.

\* \* \* \* \*